United States Patent
Kim et al.

(10) Patent No.: US 9,445,216 B2
(45) Date of Patent: Sep. 13, 2016

(54) ACTUATOR BASED ON SENSOR ACTUATOR NETWORK AND METHOD OF ACTUATING THE SAME

(71) Applicant: Electronics and Telecommunications Research Institute, Daejeon (KR)

(72) Inventors: Hyunhak Kim, Daejeon (KR); Jong-Arm Jun, Daejeon (KR); Nae-Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 142 days.

(21) Appl. No.: 14/104,389

(22) Filed: Dec. 12, 2013

(65) Prior Publication Data

US 2015/0022374 A1    Jan. 22, 2015

(30) Foreign Application Priority Data

Jul. 18, 2013    (KR) .......................... 10-2013-0084968

(51) Int. Cl.

| H04W 4/00 | (2009.01) |
|---|---|
| H04Q 9/00 | (2006.01) |
| H04W 84/18 | (2009.01) |
| F24F 11/00 | (2006.01) |
| H04L 12/28 | (2006.01) |
| H04L 29/08 | (2006.01) |

(52) U.S. Cl.
CPC .............. *H04W 4/005* (2013.01); *H04Q 9/00* (2013.01); *F24F 2011/0067* (2013.01); *F24F 2011/0068* (2013.01); *G05B 2219/25118* (2013.01); *H04L 12/2816* (2013.01); *H04L 12/2823* (2013.01); *H04L 12/2827* (2013.01); *H04L 67/12* (2013.01); *H04L 67/125* (2013.01); *H04Q 2209/20* (2013.01); *H04Q 2209/40* (2013.01); *H04W 84/18* (2013.01); *Y02B 60/50* (2013.01)

(58) Field of Classification Search
CPC ............ G05B 2219/25118; G05B 2219/2614; G05D 23/00; H04L 12/2816; H04L 12/2823; H04L 12/2827; H04L 67/125; H04L 67/12; H04W 4/005; H04Q 9/00
USPC ......................... 340/870.01, 870.07, 870.16
See application file for complete search history.

(56) References Cited

U.S. PATENT DOCUMENTS

| 7,676,280 | B1* | 3/2010 | Bash et al. ..................... 700/17 |
| 2012/0078438 | A1* | 3/2012 | Navas ................ H05K 7/20836 700/300 |
| 2013/0054174 | A1* | 2/2013 | Blank ..................... H04Q 9/00 702/104 |
| 2014/0111302 | A1* | 4/2014 | Merkel et al. ................. 340/3.1 |

FOREIGN PATENT DOCUMENTS

KR    10-2012-0076584 A    7/2012

* cited by examiner

*Primary Examiner* — Hai Phan
*Assistant Examiner* — Franklin Balseca
(74) *Attorney, Agent, or Firm* — Rabin & Berdo, P.C.

(57) ABSTRACT

In a wireless sensor actuator network system, actuators to be actuated to correspond to a plurality of sensors are selected using an A-S matrix that represents relationship strength between a plurality of actuators and the plurality of sensors based on sensing data of the plurality of sensors, and only the selected actuators determine actuation values based on values of the A-S matrix.

14 Claims, 5 Drawing Sheets

ACTUATOR BASED ON SENSOR ACTUATOR NETWORK AND METHOD OF ACTUATING THE SAME

CROSS-REFERENCE TO RELATED APPLICATION

This application claims priority to and the benefit of Korean Patent Application No. 10-2013-0084968 filed in the Korean Intellectual Property Office on Jul. 18, 2013, the entire contents of which are incorporated herein by reference.

BACKGROUND OF THE INVENTION (a) Field of the Invention

The present invention relates to an actuator based on a sensor actuator network and a method of actuating the same. More particularly, the present invention relates to a method of actuating an actuator based on data sensed by a sensor.

(b) Description of the Related Art

A sensor network consisting of small sensor apparatuses in which sensors are mounted is variously used in accordance with various purposes of use. A sensor network installed interiorly reports interior environment information to a user, and a sensor network installed in a greenhouse reports interior environment information of the greenhouse to a user.

A network that not only reports sensed information to a user but also has an actuator or a server that receives and analyzes the sensed information properly actuated is referred to as a wireless sensor/actuator network (WSAN).

Recently, a WSAN has been widely used. For example, when an actuator determines a that temperature is reduced to no more than a uniform value through sensed information of a sensor installed in a greenhouse, the actuator may command the greenhouse to actuate a heater.

In addition, in a building, an air conditioning system for a room is driven based on reports of temperature sensors attached to the room, and temperature is commonly reported every 1 to 10 seconds. An air conditioning system for an internal space is commonly driven based on values of 2 to 4 temperature sensors, which deteriorates efficiency of building energy management. Further, although cooling/heating is not required for the entire internal space, the entire internal space is cooled/heated, which deteriorates not only efficiency of building energy management but also comfort of some users, and may be harmful to some crops in a greenhouse. For example, a temperature sensor positioned at an exit of a room reports an increase in temperature for a moment caused by door opening so that valves of all variable air volume (VAV) apparatuses in the room may be actuated to reduce temperature of the room, which generates severe waste of energy. At this time, one VAV apparatus of the exit where the temperature is increased or a few VAV apparatuses around the VAV apparatus may be actuated together so that the temperature may be efficiently reduced. However, since an arrangement or structure of furniture in the room may be changed anytime and flow of the air may not be correctly predicted, it is not efficient to have a few VAV apparatuses unconditionally actuated.

SUMMARY OF THE INVENTION

A technical object of the present invention is to provide an actuator that is efficiently operated based on sensing data of a sensor to reduce waste of energy and processing, and a method of actuating the same.

According to an exemplary embodiment of the present invention, a method of actuating actuators in a wireless sensor actuator network system including a plurality of sensors and a plurality of actuators is provided. The method includes receiving sensing data of the plurality of sensors in a set report period, selecting a cooperative group that represents actuators to be actuated to correspond to the sensors using an A-S matrix that represents relationship strength between the plurality of actuators and the plurality of sensors based on the sensing data of the plurality of sensors, and the actuators included in the cooperative group determining actuation values based on values of the A-S matrix.

Selecting a cooperative group that represents actuators to be actuated to correspond to the sensors using the A-S matrix that represents relationship strength between the plurality of actuators and the plurality of sensors based on the sensing data of the plurality of sensors may include determining actuators whose A-S matrix values are no less than a set value as the cooperative group to correspond to the sensors.

The actuators included in the cooperative group determining actuation values based on values of the A-S matrix may include calculating the actuation values using actuator values of no less than the set value among the values of the A-S matrix of the actuators included in the cooperative group, and actuating the actuators in accordance with the actuation values.

Selecting a cooperative group that represents actuators to be actuated to correspond to the sensors using the A-S matrix that represents relationship strength between the plurality of actuators and the plurality of sensors based on the sensing data of the plurality of sensors may include sensing generation of an event from sensor data of a first sensor, generating an event group that represents sensors whose relationship strength values for the first sensor are no less than a set value using an S-S matrix that represents relationship strength among the plurality of sensors based on the sensing data of the plurality of sensors, and determining actuators whose A-S matrix values are no less than a set value as the cooperative group to correspond to the first sensor.

The method may further include instructing sensors of the event group to change the report period after determining actuators whose A-S matrix values are no less than a set value as the cooperative group to correspond to the first sensor.

Instructing sensors of the event group to change the report period may include setting the report period to be smaller than the set report period.

The method may further include returning the actuation value to a value before generation of the event when it is determined that the event group is extinguished after instructing sensors of the event group to change the report period.

Returning the actuation value to a value before generation of the event when it is determined that the event group is extinguished may include instructing sensors of the event group to change the report period into a report period before generation of the event.

The method may further include updating the A-S matrix and the S-S matrix when the sensing data are received in the changed report period after instructing sensors of the event group to change the report period.

Selecting a cooperative group that represents actuators to be actuated to correspond to the sensors using the A-S matrix that represents relationship strength between the plurality of actuators and the plurality of sensors based on the sensing data of the plurality of sensors may further include generating the A-S matrix and the S-S matrix using the sensing data of the plurality of sensors.

Selecting a cooperative group that represents actuators to be actuated to correspond to the sensors using the A-S matrix that represents relationship strength between the plurality of actuators and the plurality of sensors based on the sensing data of the plurality of sensors may further include transmitting the sensing data of the plurality of sensors to servers and receiving the A-S matrix and the S-S matrix from the plurality of servers.

The A-S matrix may be generated by the actuators based on changes in the sensing data of the plurality of sensors received by the actuators.

According to another exemplary embodiment of the present invention, an actuator of a wireless sensor actuator network system is provided. The actuator includes a communication unit and a controller. The communication unit receives sensing data of a plurality of sensors in a set report period. The controller selects a cooperative group that represents actuators to be actuated to correspond to the sensors using an A-S matrix that represents relationship strength between a plurality of actuators and the plurality of sensors based on the sensing data of the plurality of sensors, and determines actuation values based on values of the A-S matrix when the actuators are included in the cooperative group.

The controller may determine actuators whose A-S matrix values are no less than a set value as the cooperative group to correspond to the sensors.

When an event is generated, the controller may generate an event group that represents sensors whose relationship strength values for a sensor that generates the event are no less than a set value using an S-S matrix that represents relationship strength among the plurality of sensors based on the sensing data of the plurality of sensors, and may instruct the sensors of the event group to change the set report period.

The controller may set a report period of the sensors of the event group to be smaller than the set report period.

The communication unit may transmit the sensing data of the plurality of sensors to a server, and may receive the A-S matrix and the S-S matrix from the server.

The controller may update the A-S matrix and the S-S matrix based on the sensing data received in the changed report period, and may update the event group.

DETAILED DESCRIPTION OF THE EMBODIMENTS

Figure 1:
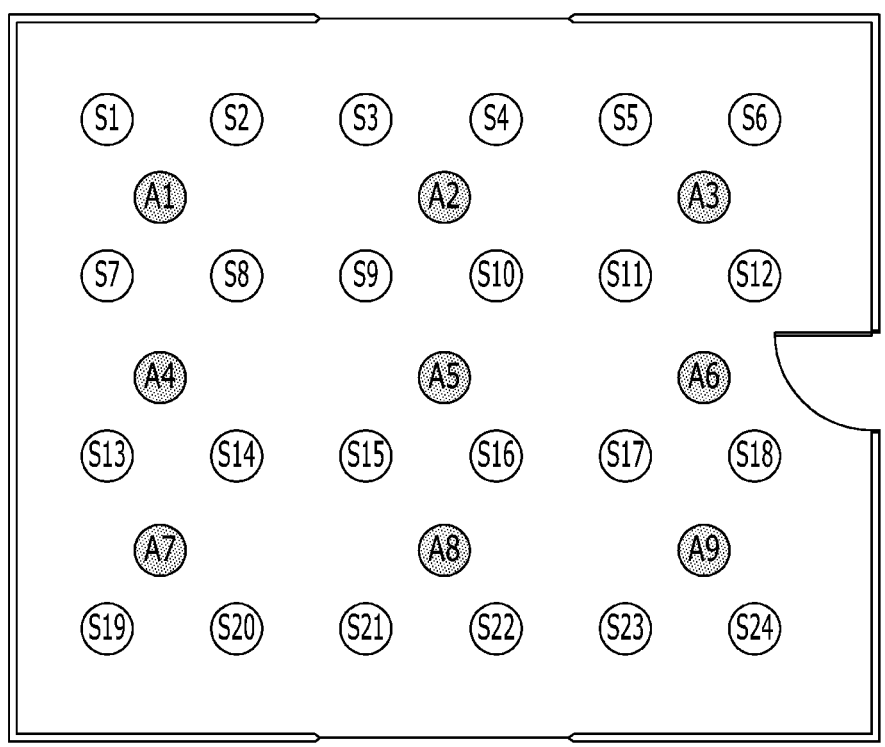
FIG. 1 is a view illustrating an example of a wireless sensor actuator network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

Hereinafter, an actuator based on a sensor actuator network according to an exemplary embodiment of the present invention and a method of actuating the same will be described in detail with reference to the accompanying drawings.

FIG. 1 is a view illustrating an example of a wireless sensor actuator network system according to an exemplary embodiment of the present invention.

Referring to FIG. 1, a wireless sensor actuator network system includes a plurality of sensors, for example, sensors S1 to S24 and at least one actuator, for example, actuators A1 to A9.

The sensors S1 to S24 sense environment information such as temperature, light, and acceleration of surroundings or physical state information and recognition information of an object in accordance with a kind thereof, and transmit sensing data to neighboring nodes, for example, neighboring sensors or neighboring actuators.

The sensors S1 to S24 perform hop communications, and may transmit/receive sensed data of the sensors S1 to S24 through the hop communications.

The actuators A1 to A9 determine actuation values based on the sensing data of the sensors S1 to S24 and are actuated in accordance with the actuation values. For example, when the sensors S1 to S24 are temperature sensors for sensing interior temperature, the actuators A1 to A9 may be variable air volume (VAV) apparatuses that are installed interiorly, and degrees to which valves of the VAV apparatuses are opened may be determined in accordance with the actuation values.

The actuators A1 to A9 perform hop communications like the sensors S1 to S24, and may transmit/receive the sensing data of the sensors S1 to S24 through the hop communications.

Figure 2:
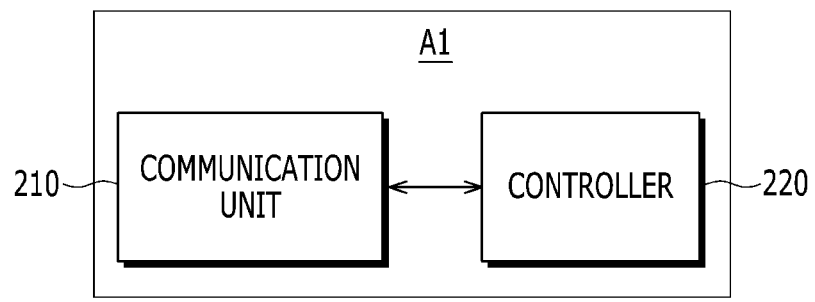
FIG. 2 is a view schematically illustrating an actuator according to an exemplary embodiment of the present invention.

FIG. 2 is a view schematically illustrating an actuator according to an exemplary embodiment of the present invention. In FIG. 2, only the actuator A1 is illustrated, and the actuators A2 to A9 may be structured like the actuator A1.

Referring to FIG. 2, the actuator A1 includes a communication unit 210 and a controller 220.

The communication unit 210 transmits and receives the sensing data of the sensors to and from a neighboring node. The communication unit 210 transmits an A-S matrix and an S-S matrix of the actuator A1 to the neighboring node, and receives an A-S matrix and an S-S matrix of the actuators A2 to A9 through the neighboring node. In addition, the communication unit 210 may receive the sensing data from the sensors.

The controller 220 generates the A-S matrix that represents relationship strength between the actuator A1 and the sensors S1 to S24. Values of the A-S matrix represent the relationship strength values between the actuator A1 and the sensors S1 to S24, and the relationship strength values represent how well the sensing data of the sensors S1 to S24 react to the actuation of the actuator A1.

In general, since a sensor closest to the actuator A1 reacts to the actuation of the actuator A1 best, a relationship strength value between the actuator A1 and the sensor closest to the actuator A may be set to be largest. However, the relationship strength values between the actuator A1 and the sensors S1 to S24 may not be proportional to distances between the actuator A1 and the sensors S1 to S24 in accordance with an environment such as arrangement of furniture, a direction of a wind exit, and flow of air.

The values of the A-S matrix of the actuator A1 may be set by a user at the beginning. Then, the controller 220 may update the A-S matrix of the actuator A1 based on changes in the sensing data of the sensors S1 to S24. The controller 220 may determine the values of the A-S matrix of the actuator A1 to be between 0 and 1 based on rankings of the changes in the sensing data of the sensors S1 to S24 caused by a change in an actuation of the actuator A1, and may determine the values of the A-S matrix of the actuator A1 to be between 0 and 1 in accordance with rates of change of the sensing data in accordance with time. For example, the changes in the sensing data of the sensors S1 to S24 are compared with each other by the actuator A1 for five minutes after a closed valve of the actuator A1 is opened 50% for cooling. At this time, when a maximum value of the changes in the sensing data of the sensors S1 to S24 is 5 degrees, reduction in the sensing data of the sensor S1 is 4.5 degrees, reduction in the sensing data of the sensor S2 is 4.0 degrees, and reduction in the sensing data of the sensor S7 is 5.0 degrees, relationship strength between the actuator A1 and the sensor S1 may be determined as 4.5/5.0=0.9, relationship strength between the actuator A1 and the sensor S2 may be determined as 4.0/5.0=0.8, and relationship strength between the actuator A1 and the sensor S7 may be determined as 5.0/5.0=1.0. In addition, the controller 220 may obtain positive correlation values among the changes in the sensing data of the sensors S1 to S24, and the correlation values may be used as the relationship strength values. At this time, correlation coefficients represent values from −1 to 1. Among the correlation coefficients, values from −1 to 0 are referred to as 0, and only correlation coefficients of no less than 0 are obtained to be used as the relationship strength values of the A-S matrix. For example, it is assumed that, after the closed valve of the actuator A1 is opened 10% for cooling, the valve of the actuator A1 is opened 20% after one minute, the valve of the actuator A1 is opened 30% after two minutes, the valve of the actuator A1 is opened 40% after three minutes, and the valve of the actuator A1 is opened 50% after four minutes. For the five minutes, the actuator A1 receives the changes in the sensing data of the sensors S1 to S24 to calculate the correlation coefficients.

The controller 220 completes the A-S matrix of the wireless sensor actuator network system based on the A-S matrix of the actuators A2 to A9 and the A-S matrix of the actuator A1. Here, the A-S matrix of the wireless sensor actuator network system means an A-S matrix between the actuators A1 to A9 and the sensors S1 to S24 of a wireless sensor actuator network. For example, the A-S matrix of the wireless sensor actuator network system may be determined as illustrated in Table 1.

TABLE 1

|    | s1 | s2 | s3 | s4 | s5 | s6 | s7 | s8 | s9 | s10 | s11 | s12 | s13 | s14 | s15 | s16 | s17 | s18 | s19 | s20 | s21 | s22 | s23 | s24 |
|----|----|----|----|----|----|----|----|----|----|-----|-----|-----|-----|-----|-----|-----|-----|-----|-----|-----|-----|-----|-----|-----|
| a1 | 0.9 | 0.8 | 0.7 | 0.6 | 0.5 | 0.4 | 1.0 | 0.9 | 0.8 | 0.7 | 0.6 | 0.4 | 0.7 | 0.6 | 0.5 | 0.4 | 0.3 | 0.1 | 0.5 | 0.4 | 0.3 | 0.2 | 0.1 | 0.0 |
| a2 | 0.7 | 0.7 | 0.8 | 0.8 | 0.7 | 0.7 | 0.8 | 0.8 | 0.9 | 0.9 | 0.8 | 0.7 | 0.5 | 0.6 | 0.7 | 0.7 | 0.6 | 0.4 | 0.2 | 0.3 | 0.4 | 0.4 | 0.3 | 0.2 |
| a3 | 0.4 | 0.5 | 0.6 | 0.7 | 0.8 | 0.9 | 0.5 | 0.6 | 0.7 | 0.8 | 0.9 | 0.9 | 0.2 | 0.3 | 0.4 | 0.5 | 0.6 | 0.6 | 0.0 | 0.1 | 0.2 | 0.3 | 0.4 | 0.5 |
| a4 | 0.7 | 0.6 | 0.4 | 0.3 | 0.3 | 0.2 | 1.0 | 0.9 | 0.8 | 0.7 | 0.6 | 0.4 | 1.0 | 0.9 | 0.8 | 0.7 | 0.6 | 0.4 | 0.7 | 0.6 | 0.4 | 0.3 | 0.3 | 0.2 |
| a5 | 0.5 | 0.6 | 0.6 | 0.6 | 0.6 | 0.5 | 0.8 | 0.9 | 1.0 | 1.0 | 0.9 | 0.7 | 0.8 | 0.9 | 1.0 | 1.0 | 0.9 | 0.7 | 0.5 | 0.6 | 0.6 | 0.6 | 0.6 | 0.5 |
| a6 | 0.4 | 0.5 | 0.5 | 0.6 | 0.8 | 0.8 | 0.5 | 0.6 | 0.7 | 0.8 | 0.9 | 0.8 | 0.5 | 0.6 | 0.7 | 0.8 | 0.9 | 0.8 | 0.4 | 0.5 | 0.5 | 0.6 | 0.8 | 0.8 |
| a7 | 0.5 | 0.4 | 0.3 | 0.2 | 0.1 | 0.0 | 0.7 | 0.6 | 0.5 | 0.4 | 0.3 | 0.1 | 1.0 | 0.9 | 0.8 | 0.7 | 0.6 | 0.4 | 0.9 | 0.8 | 0.7 | 0.6 | 0.5 | 0.4 |
| a8 | 0.2 | 0.3 | 0.4 | 0.4 | 0.3 | 0.2 | 0.5 | 0.6 | 0.7 | 0.7 | 0.6 | 0.4 | 0.8 | 0.8 | 0.9 | 0.9 | 0.8 | 0.7 | 0.7 | 0.7 | 0.8 | 0.8 | 0.7 | 0.7 |
| a9 | 0.0 | 0.1 | 0.2 | 0.3 | 0.4 | 0.5 | 0.2 | 0.3 | 0.4 | 0.5 | 0.6 | 0.6 | 0.5 | 0.6 | 0.7 | 0.8 | 0.9 | 0.9 | 0.4 | 0.5 | 0.6 | 0.7 | 0.8 | 0.9 |

In addition, the controller 220 generates an S-S matrix that represents relationship strength among the sensors S1 to S24 based on the sensing data of the sensors S1 to S24. The controller 220 may determine values of the S-S matrix to be between 0 and 1 based on rankings of similarities of the sensing data among the sensors S1 to S24, may determine values of the S-S matrix to be between 0 and 1 in accordance with rates of change of the sensing data in accordance with time, and may obtain the correlation values among the sensing data of the sensors S1 to S24 to determine the values of the S-S matrix based on the correlation values. For example, the S-S matrix among the sensors S1 to S24 may be determined as illustrated in Table 2.

TABLE 2

|     | s1 | s2 | s3 | s4 | s5 | s6 | s7 | s8 | s9 | s10 | s11 | s12 | s13 | s14 | s15 | s16 | s17 | s18 | s19 | s20 | s21 | s22 | s23 | s24 |
|-----|----|----|----|----|----|----|----|----|----|-----|-----|-----|-----|-----|-----|-----|-----|-----|-----|-----|-----|-----|-----|-----|
| s1  | 1.0 | 0.8 | 0.6 | 0.4 | 0.2 | 0.2 | 0.8 | 0.6 | 0.4 | 0.2 | 0.2 | 0.0 | 0.6 | 0.4 | 0.2 | 0.0 | 0.0 | 0.0 | 0.4 | 0.2 | 0.0 | 0.0 | 0.0 | 0.0 |
| s2  | 0.8 | 1.0 | 0.8 | 0.6 | 0.4 | 0.2 | 0.6 | 0.8 | 0.6 | 0.4 | 0.2 | 0.0 | 0.4 | 0.6 | 0.4 | 0.2 | 0.0 | 0.0 | 0.2 | 0.4 | 0.2 | 0.0 | 0.0 | 0.0 |
| s3  | 0.6 | 0.8 | 1.0 | 0.8 | 0.6 | 0.4 | 0.4 | 0.6 | 0.8 | 0.6 | 0.4 | 0.2 | 0.2 | 0.4 | 0.6 | 0.4 | 0.2 | 0.0 | 0.0 | 0.2 | 0.4 | 0.2 | 0.0 | 0.0 |
| s4  | 0.4 | 0.6 | 0.8 | 1.0 | 0.8 | 0.6 | 0.2 | 0.4 | 0.6 | 0.8 | 0.6 | 0.4 | 0.0 | 0.2 | 0.4 | 0.6 | 0.4 | 0.2 | 0.0 | 0.0 | 0.2 | 0.4 | 0.2 | 0.0 |
| s5  | 0.2 | 0.4 | 0.6 | 0.8 | 1.0 | 0.8 | 0.0 | 0.2 | 0.4 | 0.6 | 0.8 | 0.6 | 0.0 | 0.0 | 0.2 | 0.4 | 0.6 | 0.4 | 0.0 | 0.0 | 0.0 | 0.2 | 0.4 | 0.2 |
| s6  | 0.2 | 0.2 | 0.4 | 0.6 | 0.6 | 1.0 | 0.0 | 0.0 | 0.2 | 0.4 | 0.6 | 0.8 | 0.0 | 0.0 | 0.0 | 0.2 | 0.4 | 0.6 | 0.0 | 0.0 | 0.0 | 0.0 | 0.2 | 0.4 |
| s7  | 0.8 | 0.6 | 0.4 | 0.2 | 0.2 | 0.0 | 1.0 | 0.8 | 0.6 | 0.4 | 0.2 | 0.2 | 0.8 | 0.6 | 0.4 | 0.2 | 0.2 | 0.0 | 0.6 | 0.4 | 0.2 | 0.0 | 0.0 | 0.0 |
| s8  | 0.6 | 0.8 | 0.6 | 0.4 | 0.2 | 0.0 | 0.8 | 1.0 | 0.8 | 0.6 | 0.4 | 0.2 | 0.6 | 0.8 | 0.6 | 0.4 | 0.2 | 0.0 | 0.4 | 0.6 | 0.4 | 0.2 | 0.0 | 0.0 |
| s9  | 0.4 | 0.6 | 0.8 | 0.6 | 0.4 | 0.2 | 0.6 | 0.8 | 1.0 | 0.8 | 0.6 | 0.4 | 0.4 | 0.6 | 0.8 | 0.6 | 0.4 | 0.2 | 0.2 | 0.4 | 0.6 | 0.4 | 0.2 | 0.0 |
| s10 | 0.2 | 0.4 | 0.6 | 0.8 | 0.6 | 0.4 | 0.4 | 0.6 | 0.8 | 1.0 | 0.8 | 0.6 | 0.2 | 0.4 | 0.6 | 0.8 | 0.6 | 0.4 | 0.0 | 0.2 | 0.4 | 0.6 | 0.4 | 0.2 |
| s11 | 0.0 | 0.2 | 0.4 | 0.6 | 0.8 | 0.6 | 0.2 | 0.4 | 0.6 | 0.8 | 1.0 | 0.8 | 0.0 | 0.2 | 0.4 | 0.6 | 0.8 | 0.6 | 0.0 | 0.0 | 0.2 | 0.4 | 0.6 | 0.4 |
| s12 | 0.0 | 0.0 | 0.2 | 0.4 | 0.6 | 0.8 | 0.2 | 0.2 | 0.4 | 0.6 | 0.6 | 1.0 | 0.0 | 0.0 | 0.2 | 0.4 | 0.6 | 0.8 | 0.0 | 0.0 | 0.0 | 0.2 | 0.4 | 0.6 |

TABLE 2-continued

|  | s1 | s2 | s3 | s4 | s5 | s6 | s7 | s8 | s9 | s10 | s11 | s12 | s13 | s14 | s15 | s16 | s17 | s18 | s19 | s20 | s21 | s22 | s23 | s24 |
|---|---|---|---|---|---|---|---|---|---|---|---|---|---|---|---|---|---|---|---|---|---|---|---|---|
| s13 | 0.6 | 0.4 | 0.2 | 0.0 | 0.0 | 0.0 | 0.8 | 0.6 | 0.4 | 0.2 | 0.2 | 0.0 | 1.0 | 0.8 | 0.6 | 0.4 | 0.2 | 0.2 | 0.8 | 0.6 | 0.4 | 0.2 | 0.2 | 0.0 |
| s14 | 0.4 | 0.6 | 0.4 | 0.2 | 0.0 | 0.0 | 0.6 | 0.8 | 0.6 | 0.4 | 0.2 | 0.0 | 0.8 | 1.0 | 0.8 | 0.6 | 0.4 | 0.2 | 0.6 | 0.8 | 0.6 | 0.4 | 0.2 | 0.0 |
| s15 | 0.2 | 0.4 | 0.6 | 0.4 | 0.2 | 0.0 | 0.4 | 0.6 | 0.8 | 0.6 | 0.4 | 0.2 | 0.6 | 0.8 | 1.0 | 0.8 | 0.6 | 0.4 | 0.4 | 0.6 | 0.8 | 0.6 | 0.4 | 0.2 |
| s16 | 0.0 | 0.2 | 0.4 | 0.6 | 0.4 | 0.2 | 0.2 | 0.4 | 0.6 | 0.8 | 0.6 | 0.4 | 0.4 | 0.6 | 0.8 | 1.0 | 0.8 | 0.6 | 0.2 | 0.4 | 0.6 | 0.8 | 0.6 | 0.4 |
| s17 | 0.0 | 0.0 | 0.2 | 0.4 | 0.6 | 0.4 | 0.0 | 0.2 | 0.4 | 0.6 | 0.8 | 0.6 | 0.2 | 0.4 | 0.6 | 0.8 | 1.0 | 0.8 | 0.0 | 0.2 | 0.4 | 0.6 | 0.8 | 0.6 |
| s18 | 0.0 | 0.0 | 0.0 | 0.2 | 0.4 | 0.6 | 0.0 | 0.0 | 0.2 | 0.4 | 0.6 | 0.8 | 0.2 | 0.2 | 0.4 | 0.6 | 0.8 | 1.0 | 0.0 | 0.0 | 0.2 | 0.4 | 0.6 | 0.8 |
| s19 | 0.4 | 0.2 | 0.0 | 0.0 | 0.0 | 0.0 | 0.6 | 0.4 | 0.2 | 0.0 | 0.0 | 0.0 | 0.8 | 0.6 | 0.4 | 0.2 | 0.2 | 0.0 | 1.0 | 0.8 | 0.6 | 0.4 | 0.2 | 0.2 |
| s20 | 0.2 | 0.4 | 0.2 | 0.0 | 0.0 | 0.0 | 0.4 | 0.6 | 0.4 | 0.2 | 0.0 | 0.0 | 0.6 | 0.8 | 0.6 | 0.4 | 0.2 | 0.0 | 0.8 | 1.0 | 0.8 | 0.6 | 0.4 | 0.2 |
| s21 | 0.0 | 0.2 | 0.4 | 0.2 | 0.0 | 0.0 | 0.2 | 0.4 | 0.6 | 0.4 | 0.2 | 0.0 | 0.4 | 0.6 | 0.8 | 0.6 | 0.4 | 0.2 | 0.6 | 0.8 | 1.0 | 0.8 | 0.6 | 0.4 |
| s22 | 0.0 | 0.0 | 0.2 | 0.4 | 0.2 | 0.0 | 0.0 | 0.2 | 0.4 | 0.6 | 0.4 | 0.2 | 0.2 | 0.4 | 0.6 | 0.8 | 0.6 | 0.4 | 0.4 | 0.6 | 0.8 | 1.0 | 0.8 | 0.6 |
| s23 | 0.0 | 0.0 | 0.0 | 0.2 | 0.4 | 0.2 | 0.0 | 0.0 | 0.2 | 0.4 | 0.6 | 0.4 | 0.0 | 0.2 | 0.4 | 0.6 | 0.8 | 0.6 | 0.2 | 0.4 | 0.6 | 0.8 | 1.0 | 0.8 |
| s24 | 0.0 | 0.0 | 0.0 | 0.0 | 0.2 | 0.4 | 0.0 | 0.0 | 0.0 | 0.2 | 0.4 | 0.6 | 0.0 | 0.0 | 0.2 | 0.4 | 0.6 | 0.8 | 0.2 | 0.2 | 0.4 | 0.6 | 0.6 | 1.0 |

The controller 220 selects cooperative groups for the sensors S1 to S24, respectively, based on the A-S matrix of the wireless sensor actuator network system. The cooperative groups represent actuators required to be actuated in order to efficiently change sensing data of corresponding sensors.

The controller 220 determines actuation values based on relationship strength values of the actuators of the cooperative groups for the respective sensors, and performs actuations in accordance with the determined actuation values.

Particularly, when an event is generated, the controller 220 determines whether the actuator A1 is in a cooperative group for a sensor that generates the event, and when it is determined that the actuator A1 is in the cooperative group for the sensor that generates the event, the controller 220 generates an event group consisting of sensors having high relationship strength values for a sensor of an action group that generates the event using the S-S matrix and selects a cooperative group for the sensor of the action group.

When the actuator A1 is included in the cooperative group, the controller 220 determines actuation values based on relationship strength values between actuators included in the cooperative group and sensors of the action group, and actuates the actuators in accordance with the actuation values. Next, the controller 220 instructs the sensors of the event group to report sensing data in a smaller period than a set period in order to rapidly and efficiently grasp and cope with an influence of the actuation of the actuator A1.

When the controller 220 is reported about the sensing data from the sensors of the event group in a changed report period, the controller 220 updates the S-S matrix among the sensors S1 to S24 and the A-S matrix of the wireless sensor actuator network system based on the sensing data of the sensors of the event group, selects a cooperative group for the sensors of the action group like in the above-described method while updating the event group, and determines actuation values based on relationship strength values between the actuators included in the cooperative group and the sensors of the action group.

In addition, the controller 220 may perform additional actuations when the sensing data of the sensors of the action group are no less than set values. For example, when it is assumed that the sensors are temperature sensors, the controller 220 may perform control so that a user receives a fire alarm when the sensing temperature values of the sensors of the action group are no less than 40 degrees.

Figure 3:
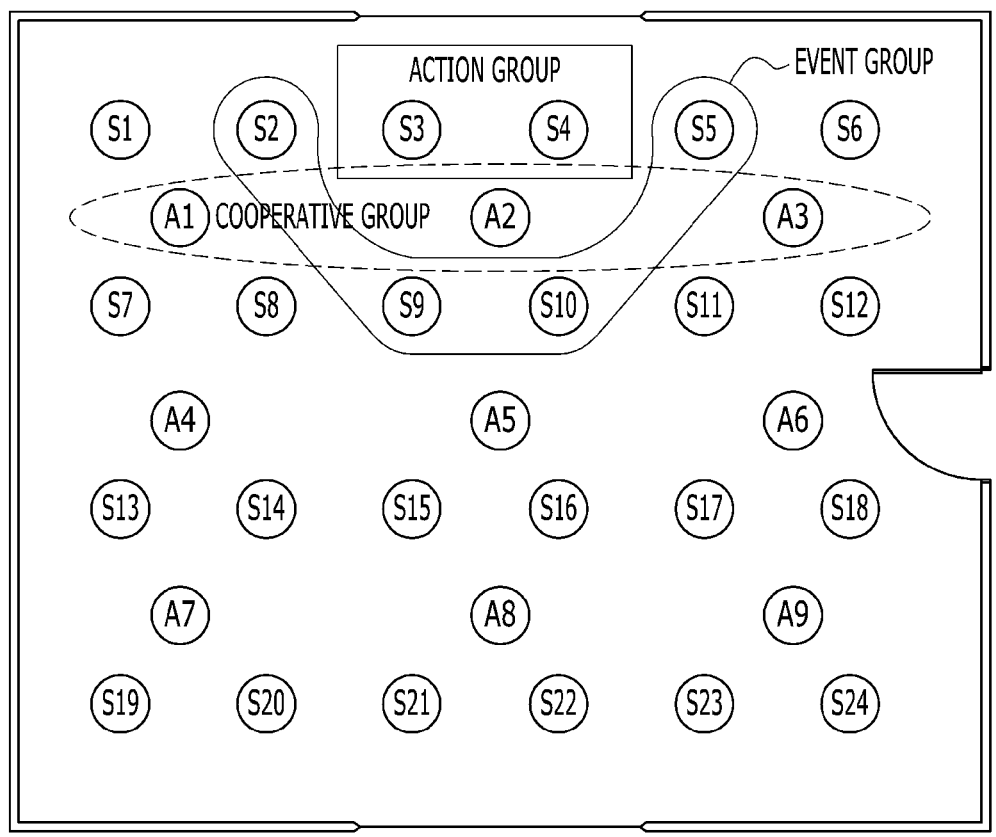
FIG. 3 is a view illustrating an event group and a cooperative group according to an exemplary embodiment of the present invention.

FIG. 3 is a view illustrating an event group and a cooperative group according to an exemplary embodiment of the present invention.

Referring to FIG. 3, when the controller 220 is reported about an increase in temperature by the sensors S3 and S4, the sensors S3 and S4 are set to be in an action group.

It is assumed that the A-S matrix of the wireless sensor actuator network system is set as illustrated in Table 1 and that the S-S matrix among the sensors S1 to S24 is set as illustrated in Table 2. In this case, in the S-S matrix among the sensors S1 to S24, since sensors having relationship strength values of no less than 0.7 for the sensor S3 of the action group are S2, S4, and S9 and sensors having relationship strength values of no less than 0.7 for the sensor S4 of the action group are S3, S5, and S10, the controller 220 may set the sensors S2, S5, S9, and S10 to be in the event group.

In addition, in the A-S matrix of the wireless sensor actuator network system, since actuators having relationship strength values of no less than 0.7 for the sensor S3 of the action group are A1 and A2 and actuators having relationship strength values of no less than 0.7 for the sensor S4 of the action group are A2 and A3, the controller 220 may set the actuators A1, A2, and A3 to be in a cooperative group for the sensors S3 and S4 of the action group.

Then, the controller 220 determines the actuation value of the actuator A1 using relationship strength values (S3–A1=0.7, S3–A2=0.8, S4–A2=0.8, and S4–A3=0.7) of the actuators A1, A2, and A3 of the cooperative group for the sensors S3 and S4 of the action group. Actuation values of the actuators A1, A2, and A3 may be determined as illustrated in Equation 1.

actuation value of $A1=(0.7)/(0.7\times2+0.8\times2)=0.233$ actuation value of $A2=(0.8+0.8)/(0.7\times2+0.8\times2)=0.533$ actuation value of $A3=(0.7)/(0.7\times2+0.8\times2)=0.2333$ (Equation 1)

At this time, when it is assumed that the actuators A1, A2, and A3 are variable air volume (VAV) apparatuses and an amount of entire cool air supplied to the actuators A1, A2, and A3 is 1, valves of the actuators A1, A2, and A3 are opened by values of 0.233, 0.533, and 0.2333.

Figure 4:
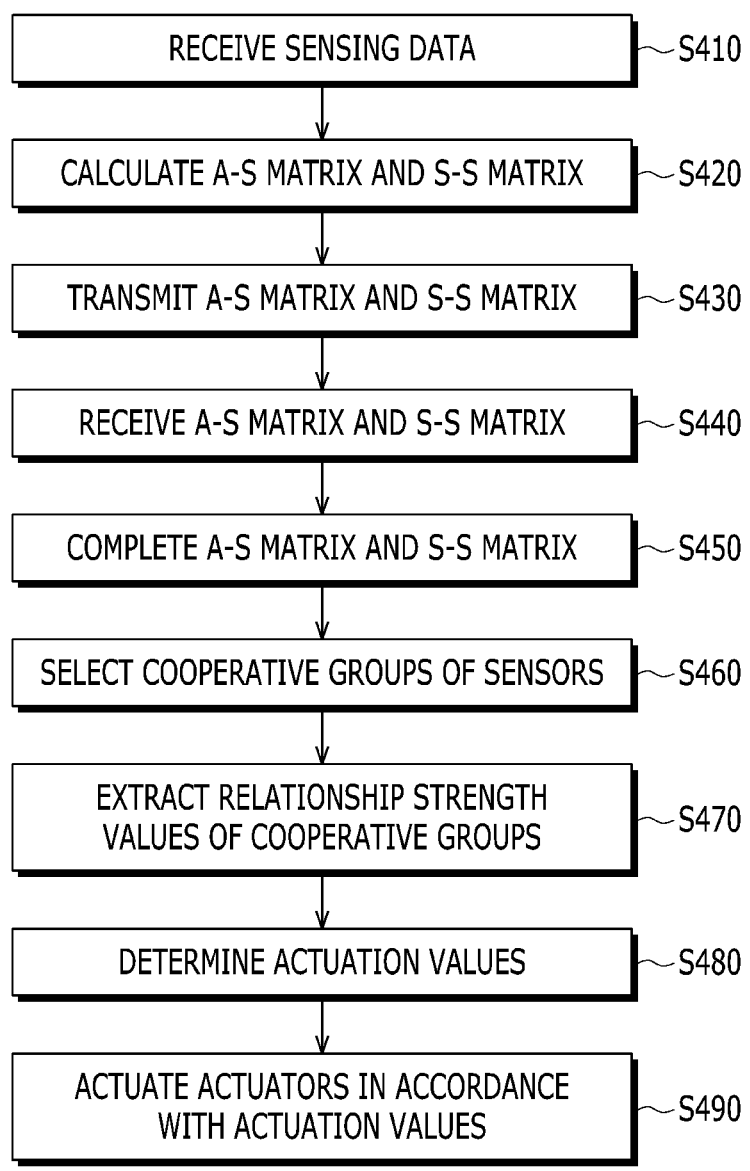
FIGS. 4 and 5 are flowcharts illustrating actuation of actuators according to first and second exemplary embodiments of the present invention, respectively.

FIG. 4 is a flowchart illustrating actuation of an actuator according to a first exemplary embodiment of the present invention, which illustrates a method of actuating an actuator in a normal state. In FIG. 4, description will be made based on the actuator A1, and the actuators A2 to A9 may be actuated like the actuator A1.

Referring to FIG. 4, the actuator A1 receives the sensing data of the sensors S1 to S24 in a set report period (S410).

The actuator A1 generates the A-S matrix between the actuator A1 and the sensors S1 to S24 and the S-S matrix among the sensors S1 to S24 using the sensing data of the sensors S1 to S24 (S420).

The actuator A1 transmits the A-S matrix between the actuator A1 and the sensors S1 to S24 and the S-S matrix among the sensors S1 to S24 to a neighboring node (S430), and receives the A-S matrix between the actuators A2 to A9 and the sensors S1 to S24 and the S-S matrix among the sensors S1 to S24 through the neighboring node (S440). At this time, the S-S matrix may not be exchanged among the actuators A1 to A9.

The actuator A1 completes the A-S matrix of the wireless sensor actuator network system based on the A-S matrix between the actuator A1 and the sensors S1 to S24 and the A-S matrix between the actuators A2 to A9 and the sensors S1 to S24 (S450).

The actuator A1 selects cooperative groups for the sensors S1 to S24 based on the A-S matrix of the wireless sensor actuator network system (S460), and extracts relationship strength values of the cooperative groups (S470).

When the actuator A1 is included in a cooperative group, the actuator A1 determines an actuation value using a relationship strength value of the cooperative group as illustrated in Equation 1 (S480), and is actuated in accordance with the operation value (S490).

By the above method, the actuator A1 repeats S410 to S490 in the set report period. When it is determined that an event is generated based on the sensing data of the sensors S3 and S4, the actuator A1 may be actuated as illustrated in FIG. 5.

Figure 5:
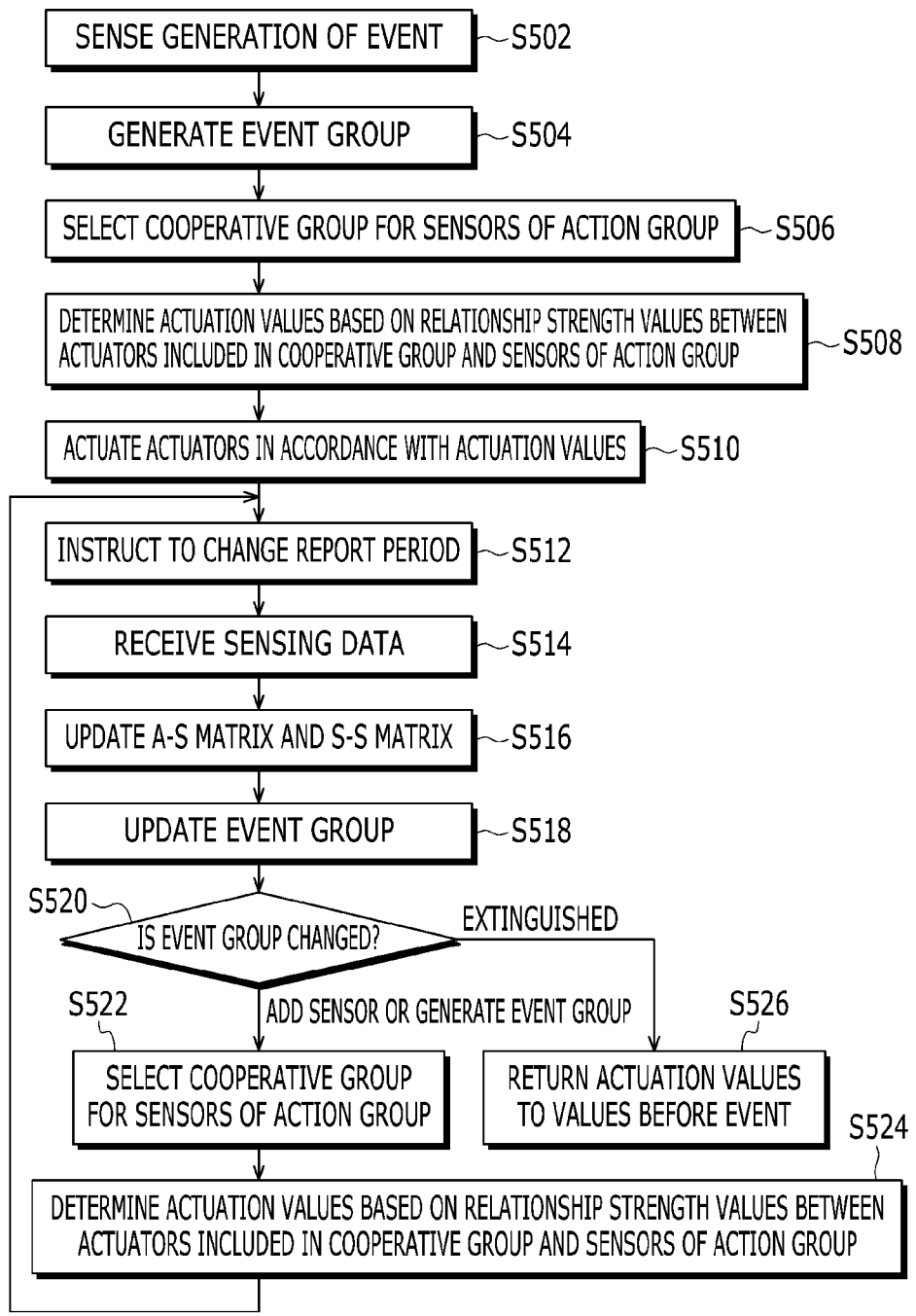

FIG. 5 is a flowchart illustrating an actuation of an actuator according to a second exemplary embodiment of the present invention, which illustrates a method of actuating an actuator when an event is generated.

Referring to FIG. 5, when it is determined that an event is generated based on the sensing data of the sensors S3 and S4 (S502), the actuator A1 generates an event group consisting of sensors having high relationship strength values for the sensors S3 and S4 of the action group that generates the event based on the S-S matrix among the sensors S1 to S24 (S504).

Next, the actuator A1 selects a cooperative group for the sensors S3 and S4 of the action group based on the A-S matrix of the wireless sensor actuator network system (S506).

When the actuator A1 is included in the cooperative group, the actuator A1 determines an actuation value based on relationship strength values between actuators included in the cooperative group and the sensors S3 and S4 of the action group (S508), and is actuated in accordance with the actuation value (S510).

Next, the actuator A1 instructs the sensors of the event group to change a report period to be smaller than a set period (S512).

The actuator A1 receives the sensing data from the sensors of the event group in the changed report period (S514).

The actuator A1 updates the S-S matrix among the sensors S1 to S24 and the A-S matrix of the wireless sensor actuator network system based on the sensing data of the sensors of the event group (S516), and updates the event group (S518).

The actuator A1 determines whether the event group is changed (S520). At this time, when a new sensor is added to the event group or a new event group is generated, the actuator A1 selects a cooperative group for the sensors of the action group using the updated A-S matrix of the wireless sensor actuator network system (S522), and determines an actuation value based on relationship strength values between the actuators included in the cooperative group and the sensors of the action group (S524).

Then, the actuator A1 instructs sensors of the new event group and the new sensor in the event group to change a report period to be smaller than a set period (S512).

On the other hand, when it is determined that the event group is extinguished, the actuator A1 returns its actuation value to a value before the event (S526). That is, the actuator A1 is actuated by the actuation value before the event and instructs the sensors of the event group to report sensing data in a previously set value.

Further, the actuators A1 to A9 may generate the S-S matrix among the sensors S1 to S24 and the A-S matrix between the actuators A1 to A9 and the sensors S1 to S24 based on the sensing data of the sensors S1 to S24, of may directly receive the S-S matrix among the sensors S1 to S24 and A-S matrix between the actuators A1 to A9 and the sensors S1 to S24 from a user. That is, the user may determine the S-S matrix among the sensors S1 to S24 and the A-S matrix between the actuators A1 to A9 and the sensors S1 to S24, and may instruct the actuators A1 to A9 to change the S-S matrix among the sensors S1 to S24 and the A-S matrix between the actuators A1 to A9 and the sensors S1 to S24 as determined by the user.

In addition, the S-S matrix among the sensors S1 to S24 and the A-S matrix between the actuators A1 to A9 and the sensors S1 to S24 may be calculated by an additional server that communicates with the actuators A1 to A9 and the sensors S1 to S24. In this case, the server may calculate the S-S matrix among the sensors S1 to S24 and the A-S matrix of the wireless sensor actuator network system based on the sensing data of the sensors S1 to S24, and may deliver the calculated S-S matrix among the sensors S1 to S24 and A-S matrix of the wireless sensor actuator network system to the actuators A1 to A9. By doing so, since the actuators A1 to A9 do not have to calculate the S-S matrix and the A-S matrix, hardware complexity may be reduced.

According to the exemplary embodiment of the present invention, only actuators required to be actuated most efficiently, rapidly, and adaptively react to a change in an event using the S-S matrix that represents a relationship among the sensors and the A-S matrix that represents a relationship between the sensors and the actuators, deviating from the conventional uniform actuations based on a report of the sensing data of the sensor nodes, so that it is possible to reduce waste off energy or processing of actuators.

The exemplary embodiment of the present invention is not realized only by the above-described apparatus and/or method, but may be realized by a program for realizing a function corresponding to configuration of the exemplary embodiment of the present invention and a recording medium in which the program is recorded. Such realization may be easily performed by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of actuating actuators in a wireless sensor actuator network system including a plurality of sensors and a plurality of actuators, the method comprising:
receiving sensing data from the plurality of sensors for a set report period;
acquiring an actuator-sensor (A-S) matrix that includes information, based on the received sensing data, indicating strengths of relationships between actuators of the plurality of actuators and sensors of the plurality of sensors;

acquiring a sensor-sensor (S-S) matrix that includes information, based on the received sensing data, indicating strengths of relationships among said plurality of sensors;

determining an action group of sensors that generate an event based on the received sensing data, the action group consisting of at least one sensor among said plurality of sensors;

selecting an event group of sensors from among the sensors of said plurality of sensors using the S-S matrix, the strength of relationship of each sensor of the event group with the at least one sensor of the action group having a value that exceeds a first set value;

selecting a cooperative group of actuators from among the actuators of said plurality of actuators, the cooperative group corresponding to the action group based on the A-S matrix information;

determining, by the actuators in the cooperative group, actuation values based on the A-S matrix information;

actuating the actuators in the cooperative group according to the determined actuation values;

instructing the sensors of the event group to change the set report period by setting their report period to be shorter than the set report period; and updating the A-S matrix and the S-S matrix when the sensing data is received from the sensors of the event group for the changed report period.

2. The method of claim 1, wherein said selecting a cooperative group comprises determining a set of actuators in the cooperative group, each having A-S matrix information associated therewith indicating the strengths of relationships with the at least one sensor of the action group, said strengths of relationships with the at least one sensor being of no less than a second set value.

3. The method of claim 2, further comprising:

calculating the actuation values for the set of actuators in the cooperative group using the A-S matrix information associated therewith indicating strengths of relationships with the at least one sensor of the action group of no less than the second set value.

4. The method of claim 1, further comprising changing the actuation values of the actuators in the cooperative group after the event is generated;

determining that the event group is extinguished;

returning the actuation values of the actuators in the cooperative group to their respective values before the event was generated in response to said determining that the event group is extinguished.

5. The method of claim 4, further comprising:

instructing the sensors of the event group to return the changed report period to the set report period in response to said determining that the event group is extinguished.

6. The method of claim 1, further comprising:

transmitting the sensing data received from the plurality of sensors to a server; and receiving the A-S matrix and the S-S matrix from the server for use in said selecting an event group and said selecting a cooperative group.

7. The method of claim 1, wherein said acquiring an A-S matrix includes:

receiving a plurality of A-S matrices generated by the plurality of actuators based on changes in the sensing data from the plurality of sensors; and generating the A-S matrix using the received plurality of A-S matrices.

8. The method of claim 1, further comprising:

changing the event group;

determining, by the actuators in the cooperative group, new actuation values in response to the event group being changed; and actuating the actuators in the cooperative group according to the new actuation values in response to the event group being changed.

9. The method of claim 8, wherein changing the event group includes adding a new sensor to the event group or replacing the event group by a new event group.

10. An actuator of a wireless sensor actuator network system in which the system includes a plurality of actuators and a plurality of sensors, the actuator comprising:

a communication unit that receives sensing data from the plurality of sensors for a set report period; and a controller that acquires an actuator-sensor (A-S) matrix that includes information, based on the received sensing data, indicating strengths of relationships between actuators of the plurality of actuators and sensors of the plurality of sensors, and acquires a sensor-sensor (S-S) matrix that includes information, based on the received sensing data, indicating strengths of relationships among the plurality of sensors;

determines an action group of sensors that generate an event based on the received sensing data, the action group consisting of at least one sensor among said plurality of sensors;

selects an event group of sensors from among the sensors of said plurality of sensors using the S-S matrix, the strength of relationship of each sensor of the event group with the at least one sensor of the action group exceeding a first set value, selects a cooperative group of actuators from among the actuators of said plurality of actuators, the cooperative group corresponding to the action group based on the A-S matrix information, determines an actuation value based on the A-S matrix information after the cooperative group is selected, controls the actuator to actuate according to the determined actuation value, controls the sensors of the event group to change the set report period by setting their report period to be shorter than the set report period, and updates the A-S matrix and the S-S matrix when sensing data is received from the sensors of the event group for the changed report period.

11. The actuator of claim 10, wherein the controller determines a set of actuators in the cooperative group, each having A-S matrix information associated therewith indicating the strengths of relationships with the at least one sensor of the action group, said strengths of relationships with the at least one sensor being of no less than a second set value.

12. The actuator of claim 10, wherein the communication unit transmits the sensing data received from the plurality of sensors to a server, and receives the A-S matrix and the S-S matrix from the server for use in the selection of the event group and the cooperative group.

13. The actuator of claim 10, wherein the controller updates the event group for the changed report period.

14. The actuator of claim 10, wherein the sensors of the event group are the only sensors from the plurality of sensors controlled to change their set report period.

* * * * *